US012762072B2

(12) United States Patent
Jo

(10) Patent No.: US 12,762,072 B2
(45) Date of Patent: Oct. 13, 2026

(54) INTERFACE SYSTEM AND OPERATING METHOD THEREOF

(71) Applicant: SK hynix Inc., Gyeonggi-do (KR)

(72) Inventor: Byung Gu Jo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 19/012,871

(22) Filed: Jan. 8, 2025

(65) Prior Publication Data

US 2025/0298758 A1 Sep. 25, 2025

(30) Foreign Application Priority Data

Mar. 20, 2024 (KR) ........................ 10-2024-0038503

(51) Int. Cl.
*G06F 13/16* (2006.01)

(52) U.S. Cl.
CPC ...... *G06F 13/1673* (2013.01); *G06F 13/1642* (2013.01); *G06F 13/1689* (2013.01)

(58) Field of Classification Search
CPC ............. G06F 13/1673; G06F 13/1642; G06F 13/1689; G06F 5/06; G06F 5/10; G06F 2205/067
See application file for complete search history.

(56) References Cited

U.S. PATENT DOCUMENTS

| | | | | |
|---|---|---|---|---|
| 9,489,009 | B2 * | 11/2016 | Lee | G06F 13/42 |
| 11,249,511 | B2 * | 2/2022 | Thong | G06F 1/12 |
| 2005/0262314 | A1 * | 11/2005 | Oh | G06F 5/10 711/154 |

FOREIGN PATENT DOCUMENTS

| | | | |
|---|---|---|---|
| KR | 10-1998-0045940 | A | 9/1998 |
| KR | 10-1510862 | B1 | 4/2015 |

* cited by examiner

*Primary Examiner* — Idriss N Alrobaye
*Assistant Examiner* — Richard B Franklin
(74) *Attorney, Agent, or Firm* — IP&T GROUP LLP

(57) ABSTRACT

An interface system may include a first interface device and a second interface device. The first interface device may include a first buffer. The second interface device may include a second buffer. The first interface device may compare a write pointer of the first buffer, which corresponds to the second interface device, with a read pointer of the first buffer, which corresponds to the first interface device, and update the read pointer, based on the comparison result. Each of the write pointer of the first buffer and the read pointer of the first buffer may include data bits indicating an address of the first buffer and a data bit indicating a reset signal. The first interface device may selectively update the read pointer according to the reset signal of the write pointer of the first buffer.

20 Claims, 14 Drawing Sheets

| AXI Bus | Interface 1 | Interface 2 |
|---|---|---|
| CH1 (AW/AR/W) | Source | Destination |
| CH2 (R/B) | Destination | Source |

INTERFACE SYSTEM AND OPERATING METHOD THEREOF

CROSS-REFERENCE TO RELATED APPLICATION

The present application claims priority under 35 U.S.C. § 119(a) to Korean patent application number 10-2024-0038503 filed on Mar. 20, 2024, in the Korean Intellectual Property Office, the entire disclosure of which is incorporated by reference herein.

BACKGROUND

1. Field of Invention

The present disclosure generally relates to an electronic device, and more particularly, to an interface system and an operating method thereof.

2. Description of Related Art

When clock domains between a master and a slave are different from each other, an asynchronous interface may be used. The asynchronous interface may include a buffer having a First-In First-Out (FIFO) data structure. A write pointer may indicate an address of a buffer to which data is written, and a read pointer may indicate an address of a buffer from which data is read. A buffer may have a full or empty state according to a distance between the write pointer and the read pointer.

SUMMARY

Embodiments provide an interface system and an operating method thereof, which can prevent malfunction in a reset operation of interface devices operating according to different clocks.

In accordance with an aspect of the present disclosure, there is provided an interface system including: a first interface device including a first buffer; and a second interface device including a second buffer, wherein the first interface device compares a write pointer of the first buffer with a read pointer of the first buffer, and updates the read pointer based on the comparison result, the write pointer of the first buffer corresponds to the second interface device, and the read pointer of the first buffer corresponds to the first interface device, wherein each of the write pointer of the first buffer and the read pointer of the first buffer includes data bits indicating an address of the first buffer and a data bit indicating a reset signal, and wherein the first interface device selectively updates the read pointer according to the reset signal of the write pointer of the first buffer.

In accordance with another aspect of the present disclosure, there is provided a method of operating an interface system including a first interface device including a first buffer and a second interface device including a second buffer, the method including: comparing, by the first interface device, a write pointer of the first buffer with a read pointer of the first buffer, wherein the write pointer of the first buffer corresponds to the second interface device, and the read pointer of the first buffer corresponds to the first interface device; and selectively updating, by the first interface device, the read pointer of the first buffer based on the comparison result and a reset signal of the write pointer of the first buffer, wherein each of the write pointer of the first buffer and the read pointer of the first buffer includes data bits indicating an address of the first buffer and a data bit indicating the reset signal.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figures 1A, 1B:
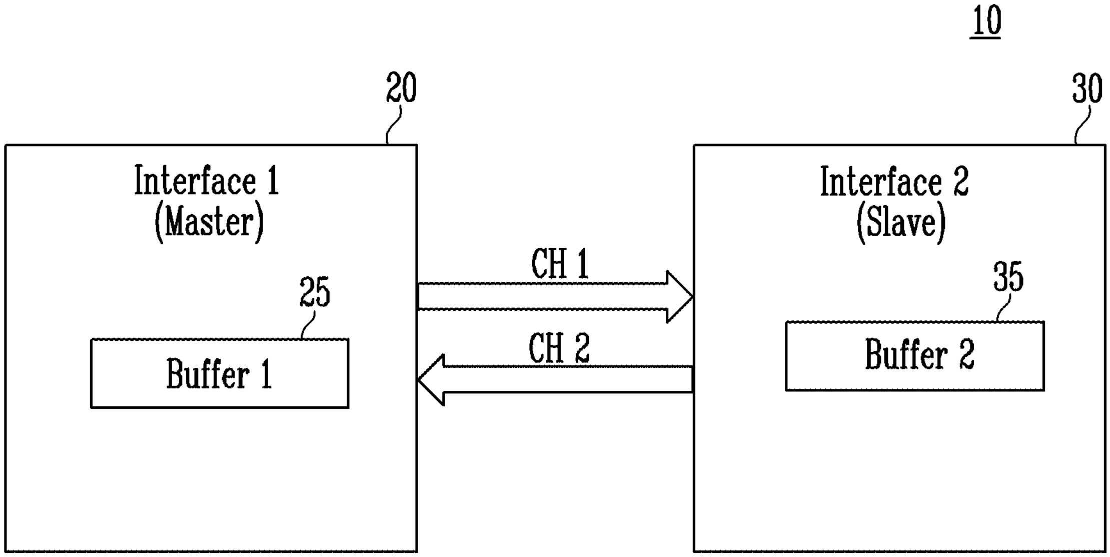
FIG. 1A is a diagram illustrating an interface system in accordance with an embodiment of the present disclosure.
FIG. 1B is a diagram illustrating a first channel and a second channel, which are shown in FIG. 1A.

FIG. 1A is a diagram illustrating an interface system in accordance with an embodiment of the present disclosure.

Referring to FIG. 1A, the interface system 10 may include a first interface device 20 and a second interface device 30. The first interface device 20 and the second interface device 30 may operate according to different clocks. Therefore, the first interface device 20 and the second interface device 30 may operate as an asynchronous interface.

For example, the first interface device 20 may operate according to a first clock, and the second interface device 30 may operate according to a second clock different from the first clock. The first interface device 20 may transmit data to the second interface device 30 through a first channel CH1, and the second interface device 30 may transmit data to the first interface device 20 through a second channel CH2. The first interface device 20 may perform, according to the first clock, Clock Domain Crossing (CDC) processing on a signal synchronized with the second clock, which is received from the second interface device 30 through the first channel CH1. The second interface device 30 may perform, according to the second clock, CDC processing on a signal synchronized with the first clock, which is received from the first interface device 20 through the second channel CH2.

The first interface device 20 may include a first buffer 25, and the second interface device 30 may include a second buffer 35. The first buffer 25 and the second buffer 35 may include a First-In First-Out (FIFO) data structure.

A write pointer of the first buffer 25 may correspond to the second interface device 30, and a read pointer of the first buffer 25 may correspond to the first interface device 20. The write pointer of the first buffer 25 may indicate an address of data which the second interface device 30 writes to the first buffer 25. The read pointer of the first buffer 25 may indicate an address of data which the first interface device 20 reads from the first buffer 25.

Similarly, a write pointer of the second buffer 35 may correspond to the first interface device 20, and a read pointer of the second buffer 35 may correspond to the second interface device 30. The write pointer of the second buffer 35 may indicate an address of data which the first interface device 20 writes to the second buffer 35. The read pointer of the second buffer 35 may indicate an address of data which the second interface device 30 reads from the second buffer 35.

In an embodiment, the first interface device 20 may compare the write pointer and the read pointer of the first buffer 25 with each other. The write pointer of the first buffer 25 may be a signal obtained by CDC processing on a signal received from the second interface device 30, according to the first clock instead of the second clock.

The first interface device 20 may selectively update the read pointer according to a reset signal of the write pointer and a comparison result between the read pointer and the write pointer. Each of the write pointer and the read pointer of the first buffer 25 may include data bits indicating an address of the first buffer 25 and a data bit indicating the reset signal.

For example, when a reset signal of the write pointer of the first buffer 25 is in an activated state, the first interface device 20 may suspend data reading from the first buffer 25 and updating of the read pointer. When the reset signal of the write pointer of the first buffer 25 is in an inactivated state, the first interface device 20 may perform the data reading from the first buffer 25 and the updating of the read pointer, based on the comparison result. When the write pointer has an address value higher than an address value of the read pointer as the comparison result, the first interface device 20 may read data from the first buffer 25, and update the address value of the read pointer. When the write pointer has the same address value as the read pointer as the comparison result, the first interface device 20 may not read the data from the first buffer 25, and update the address value of the read pointer.

When a reset signal of the read pointer of the first buffer 25 is in the activated state, the second interface device 30 may suspend data writing to the first buffer 25 and updating of the write pointer of the first buffer 25.

When a reset signal of the read pointer of the second buffer 35, which corresponds to the second interface device 30, is in the activated state, the first interface device 20 may suspend data writing to the second buffer 35 and updating of the write pointer of the second buffer 35.

The first interface device 20 may operate as a master, and the second interface device 30 may operate as a slave. The device operating as the master may include a Central Processing Unit (CPU), a Direct Memory Access (DMA), a Graphic Processing Unit (GPU), a video codec, a Digital Signal Processor (DSP), an Image Signal Processor (ISP), and a display controller. The device operating as the slave may include a dynamic random access memory (DRAM) memory controller, a static random access memory (SRAM) memory controller, a Special Function Register (SFR) of various types of IPs, and a peripheral circuit (e.g., universal asynchronous receiver/transmitter (UART), a two-wire serial communication protocol I2C, a three-wire serial communication protocol I2S, Sony/Philips Digital Interface (SPDIF)) or the like.

FIG. 1B is a diagram illustrating the first channel and the second channel, which are shown in FIG. 1A.

Referring to FIG. 1B, for the first channel CH1, the first interface device may be a source which transmits data, and the second interface device may be a destination which receives data. For the second channel CH2, the second interface device may be a source which transmits data, and the first interface device may be a destination which receives data.

Data transmission/reception directions of the first channel CH1 and the second channel CH2 may be opposite to each other. In FIG. 1B, the first channel CH1 may include a read address (AR) channel, a write address (AW) channel, and a write data (W) channel of an Advanced extensible Interface (AXI) protocol. The second channel CH2 may include a read data (R) channel and a write response (B) channel of the AXI protocol.

Figure 1C:
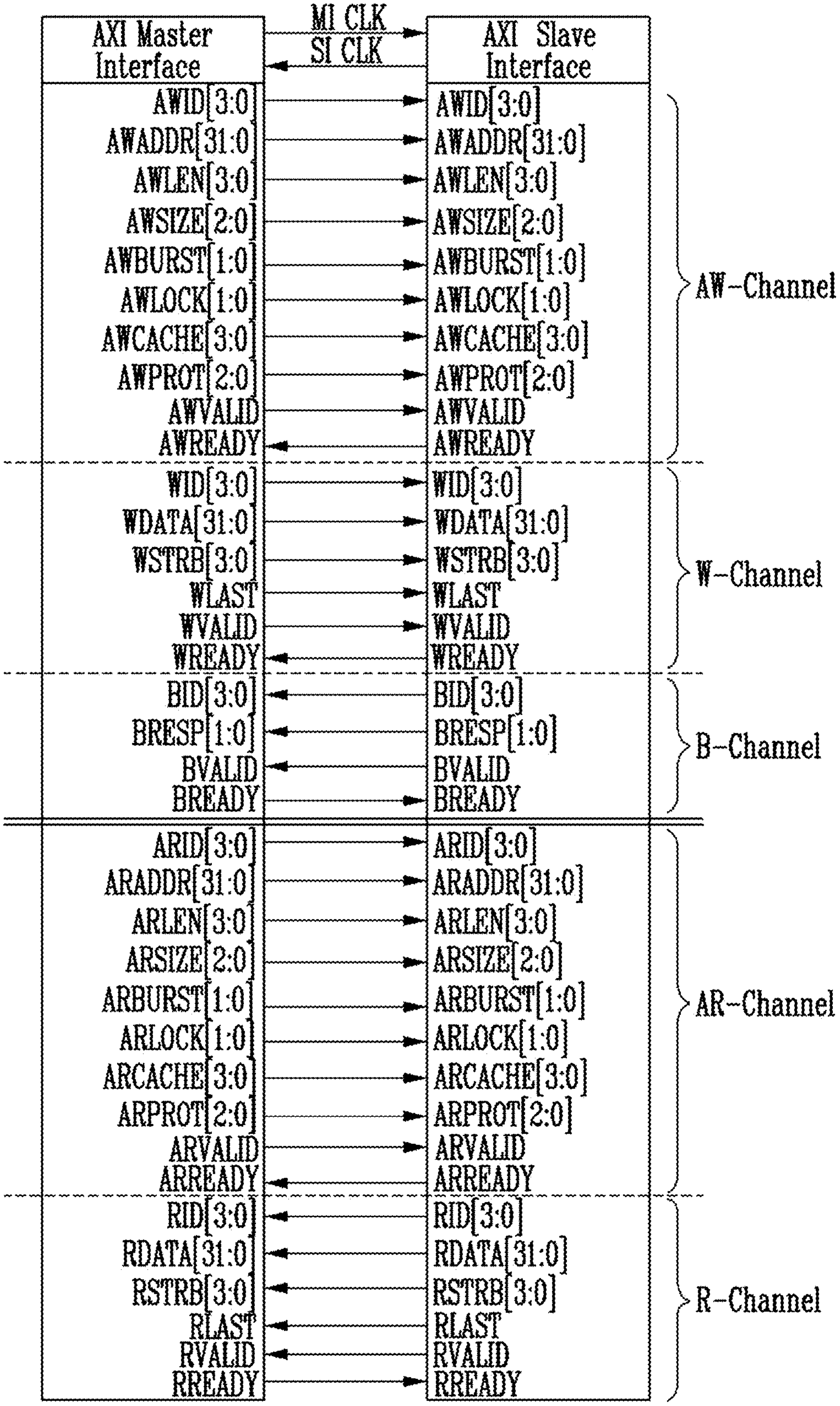
FIG. 1C is a diagram illustrating a channel of an Advanced extensible Interface (AXI) protocol in accordance with an embodiment of the present disclosure.

FIG. 1C is a diagram illustrating a channel of an Advanced extensible Interface (AXI) protocol in accordance with an embodiment of the present disclosure.

Referring to FIG. 1C, the AXI protocol may include a read address channel (hereinafter, referred to as an AR channel), a read data channel (hereinafter, referred to as an R channel), a write address channel (hereinafter, referred to as an AW channel), a write data channel (hereinafter, referred to as a W channel), and a write response channel (hereinafter, referred to as a B channel).

The AR channel may transmit a read address ARADDR along with a read address enable signal ARVALID from the master to the slave. After that, the AR channel may transmit an acknowledge signal ARREADY from the slave to the master. The AR channel may include Read Address ID (ARID), Read Address (ARADDR), Burst Length (ARLEN), Burst Size (ARSIZE), Burst Type (ARBURST), Read Address/Control Valid (ARVALID), and Read Address/Control Accepted (ARREADY).

The R channel may transmit read data RDATA along with a read data enable signal RVALID from the slave to the master. After that, the R channel may transmit an acknowledge signal RREADY from the master to the slave. The R channel may include Read Data ID (RID), Read Data (RDATA), Read Strobe (RSTRB), Last Read Transfer in a Burst (RLAST), Read Data Valid (RVALID), and Read Data Accepted (RREADY).

The AW channel may transmit a write address AWADDR along with a write address enable signal AWVALID from the master to the slave. After that, the AW channel may transmit an acknowledge signal AWREADY from the slave to the master. The AW channel may include Write Address ID (AWID), Write Address (AWADDR), Burst Length (AWLEN), Burst Size (AWSIZE), Burst Type (AWBURST), Write Address/Control Valid (AWVALID), and Write Address/Control Accepted (AWREADY).

The W channel may transmit write data WDATA along with a write enable signal WVALID from the master to the slave. After that, the W channel may transmit an acknowledge signal (WREADY) from the slave to the master. The W channel may include Write Data ID (WID), Write Data (WDATA), Write Strobe (WSTRB), Last Write Transfer in a Burst (WLAST), Write Data Valid (WVALID), and Write Data Accepted (WREADY).

The B channel may transmit a completion response BRESP of a write operation along with a response enable signal BVAILD from the slave to the master. After that, the B channel may transmit an acknowledge signal BREADY from the master to the slave. The B channel may include Write Data ID (BID), Write Response (BRESP), Write Response Valid (BVALID), and Write Response Accepted (BREADY).

The AR channel, the R channel, the AW channel, the W channel, and the B channel may be independently located between the master and the slave, and share a master clock MI_CLK and a slave clock SI_CLK.

Therefore, the AR channel may be connected to a FIFO memory (e.g., a read address buffer queue) so as to store a read address transmitted through the AR channel. The R channel may be connected to a FIFO memory (e.g., a read data buffer queue) so as to store read data transmitted through the R channel. The AW channel may be connected to a FIFO memory (e.g., a write address buffer queue) so as to store a write address transmitted through the AW channel. The W channel may be connected to a FIFO memory (e.g., a write data buffer queue) so as to store write data transmitted through the W channel. The B channel may be connected to a FIFO memory (e.g., a response buffer queue) so as to store a response transmitted through the B channel.

The first interface device described with reference to FIG. 1B may operate as a master, and the second interface device described with reference to FIG. 1B may operate as a slave. The first channel may include at least one of the AW channel, the AR channel, and the W channel. The second channel may include at least one of the R channel and the B channel.

Figure 2A:
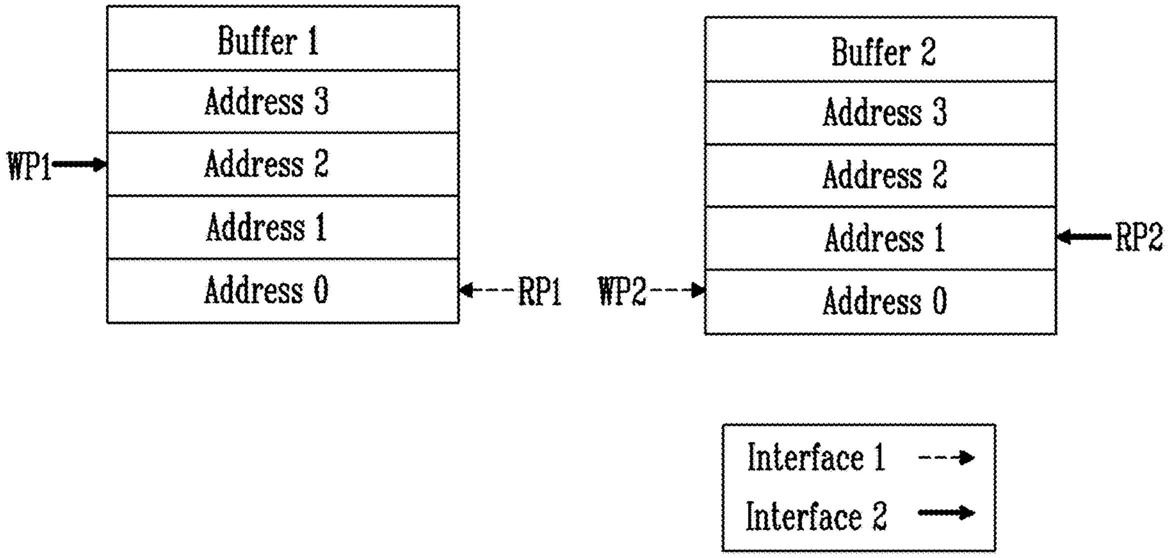
FIG. 2A is a diagram illustrating a reset operation of a read pointer and a write pointer, which correspond to a first interface operation.

FIG. 2A is a diagram illustrating a reset operation of a read pointer and a write pointer, which correspond to the first interface operation.

Referring to FIG. 2A, a read pointer RP1 of the first buffer and a write pointer WP2 of the second buffer may correspond to the first interface device. A write pointer WP1 of the first buffer and a read pointer RP2 of the second buffer may correspond to the second interface device. The first interface device and the second interface device may have different operation clocks, and operate as an asynchronous interface. Since the first interface device and the second interface device have different operation clocks, a reset signal of the first interface device and a reset signal of the second interface device may be activated at different timings.

In FIG. 2A, the reset signal of the first interface device has been activated, but the reset signal of the second interface device may yet be inactivated.

The read pointer RP1 of the first buffer and the write pointer WP2 of the second buffer may be simultaneously reset according to the reset signal of the first interface device. An address value of the write pointer WP1 of the first buffer and an address value of the read pointer RP1 of the first buffer are different from each other, but the read pointer RP1 of the first buffer is in a state in which the read pointer RP1 is reset. Therefore, data reading and updating of the read pointer RP1 may not be performed in the first buffer.

On the other hand, an address value Address 0 of the write pointer WP2 of the second buffer and an address value Address 1 of the read pointer RP2 of the second buffer are different from each other, and the read pointer RP2 of the second buffer is in a state in which the read pointer RP2 is not reset. Therefore, a data read operation may be performed in the second buffer. While the read pointer RP2 of the second buffer is changed in an order of Address 2, Address 3, and Address 0, invalid data stored at Address 2, Address 3, and Address 0 may be read (or popped).

Since the first interface device and the second interface device have different operation clocks, malfunction that invalid data is read in the second buffer due to a reset operation of the first interface device may occur.

Figure 2B:
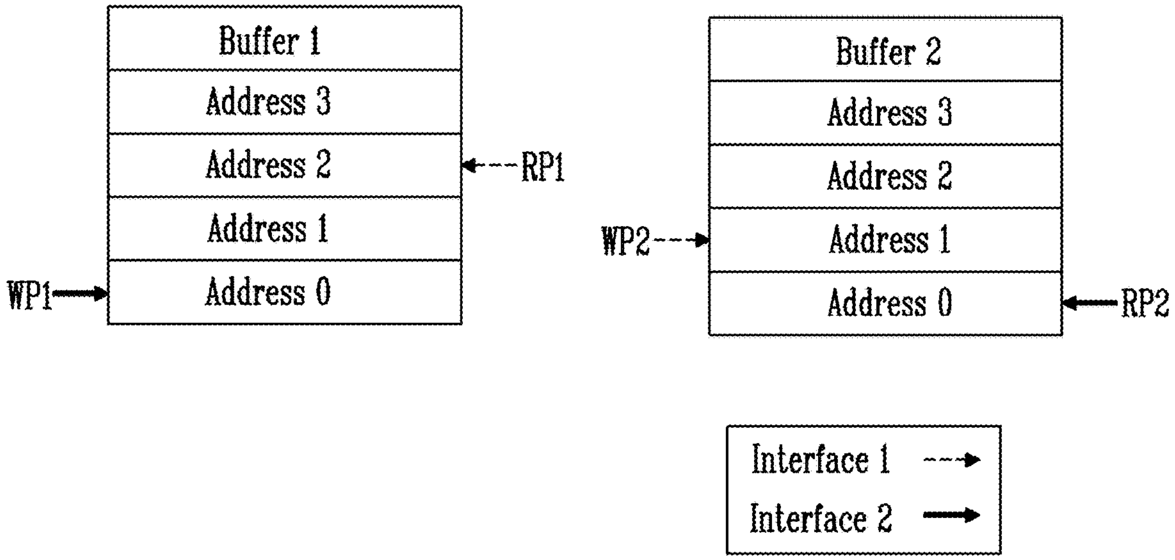
FIG. 2B is a diagram illustrating a reset operation of a read pointer and a write pointer, which correspond to a second interface operation.

FIG. 2B is a diagram illustrating a reset operation of a read pointer and a write pointer, which correspond to the second interface operation.

Referring to FIG. 2B, the reset signal of the second interface device has been activated, but the reset signal of the first interface device may yet be inactivated.

The write pointer WP1 of the first buffer and the read pointer RP2 of the second buffer may be simultaneously reset according to the reset signal of the second interface device. The address value Address 0 of the write pointer WP1 of the first buffer and the address value Address 2 of the read pointer RP1 of the first buffer are different from each other, and the read pointer RP1 of the first buffer is in a state in which the read pointer RP1 is not reset. Therefore, a data read operation may be performed in the first buffer. While the read pointer RP1 of the first buffer is changed in an order of Address 3 and Address 0, invalid data stored at Address 3 and Address 0 may be read (or popped).

The address value Address 1 of the write pointer WP2 of the second buffer and the address value Address 0 of the read pointer RP2 of the second buffer are different from each other, but the read pointer RP2 of the second buffer is in a state in which the read pointer RP2 is reset. Therefore, data reading and updating of the read pointer RP2 may not be performed in the second buffer.

Since the first interface device and the second interface device have different operation clocks, malfunction that invalid data is read in the first buffer due to a reset operation of the second interface device may occur.

Figure 3:
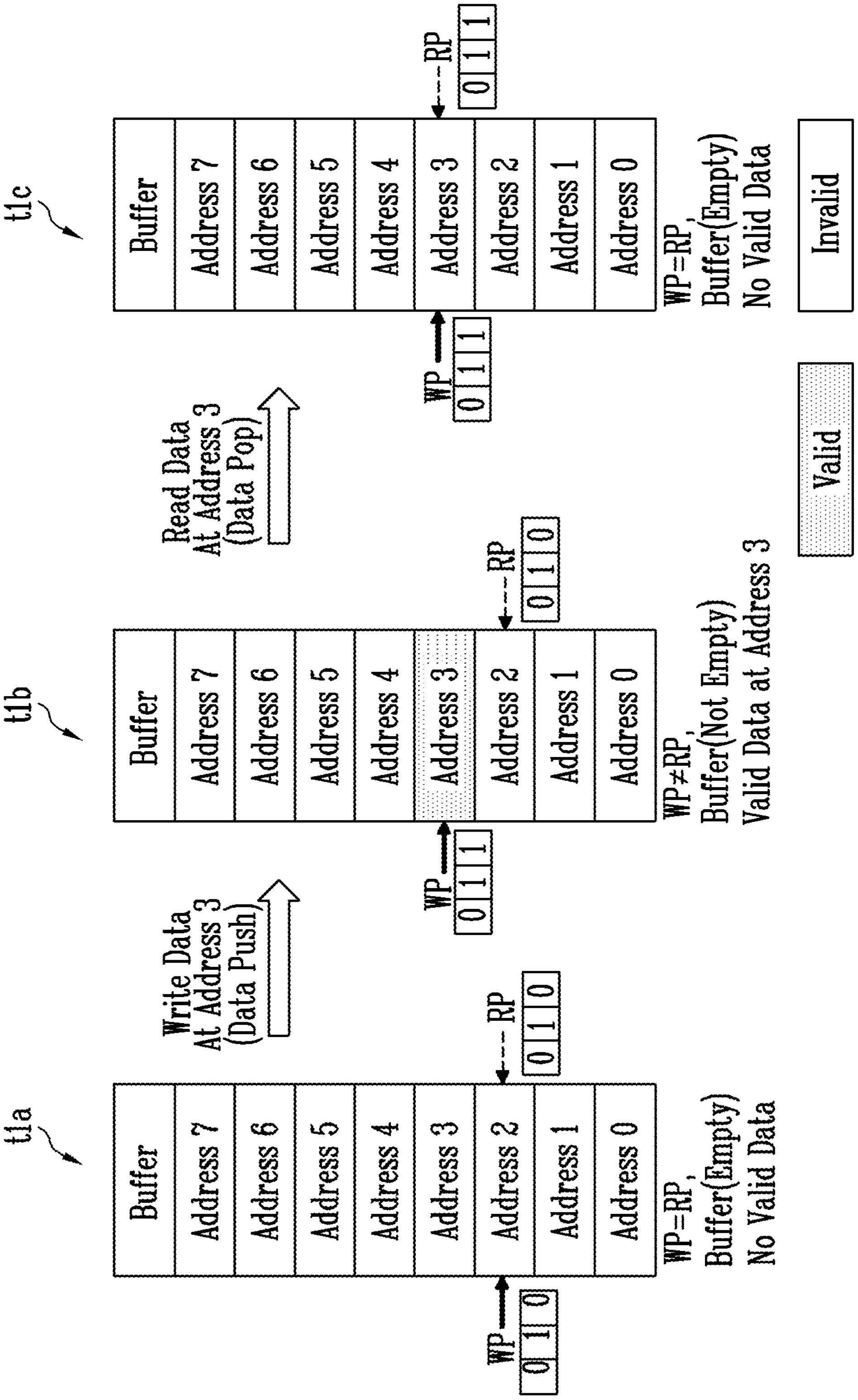
FIG. 3 is a diagram illustrating an operation of a buffer including a First-In First-Out (FIFO) data structure in accordance with an embodiment of the present disclosure.

FIG. 3 is a diagram illustrating an operation of a buffer including a First-In First-Out (FIFO) data structure in accordance with an embodiment of the present disclosure.

Referring to FIG. 3, the buffer may write (or push) data at Address 0 to Address 7 or read (or pop) data stored at Address 0 to Address 7. An interface device corresponding to a write pointer WP of the buffer and an interface device corresponding to a read pointer RP of the buffer may operate according to different clocks.

At t1*a*, since address values of the write pointer WP and the read pointer RP are the same as 2, the buffer may be in a state in which the buffer is empty and no stored valid data exists.

While data is written (or pushed) at Address 3, an address value of the write pointer WP may be updated from 2 to 3.

At t1*b*, the address value of the write pointer WP is 3 and an address value of the read pointer RP is 2, which are different from each other. Therefore, the buffer may be in a state in which the buffer is not empty and valid data is stored at Address 3.

While the valid data stored at Address 3 is read (or popped), the address value of the read pointer RP may be updated from 2 to 3.

At t1*c*, since the address values of the write pointer WP and the read pointer RP are the same as 3, the buffer may be in a state in which the buffer is empty and no stored valid data exists.

As described with reference to FIG. 3, in the buffer including the FIFO data structure, data input/output may be performed through comparison between the write pointer WP and the read pointer RP.

Figure 4:
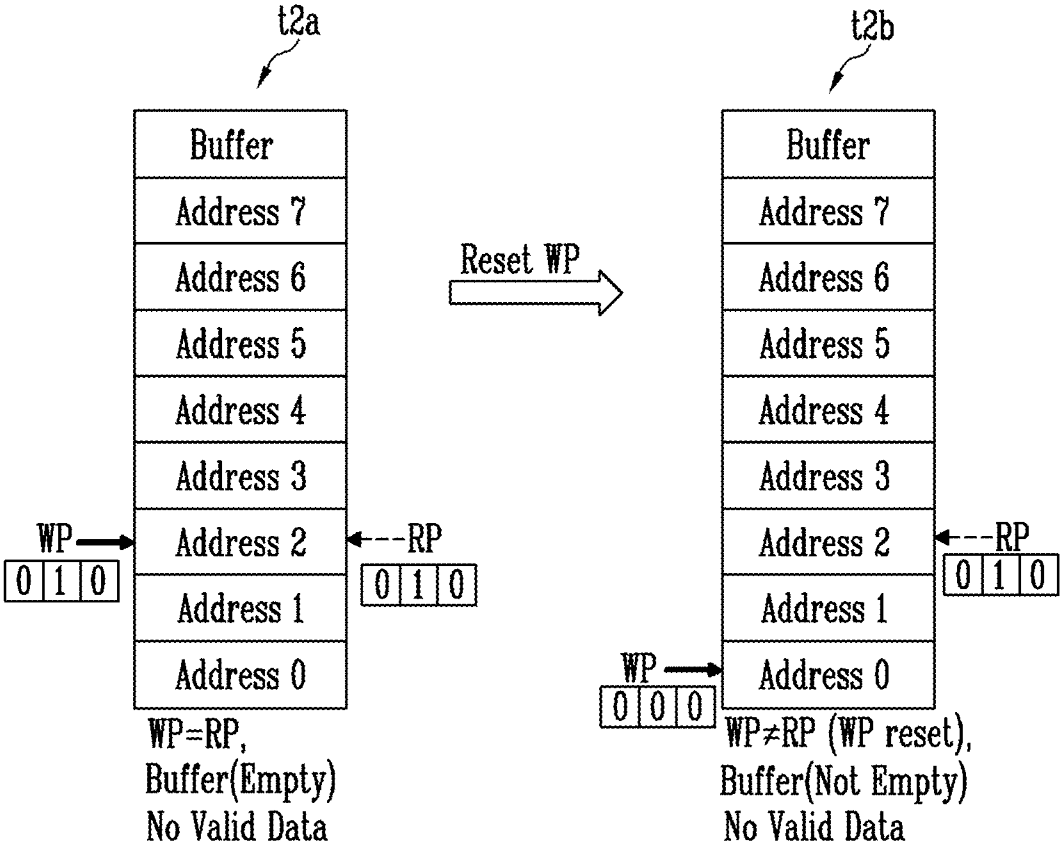
FIG. 4 is a diagram illustrating an operation of the buffer when a write pointer is reset in accordance with an embodiment of the present disclosure.

FIG. 4 is a diagram illustrating an operation of the buffer when the write pointer is reset in accordance with an embodiment of the present disclosure.

Referring to FIG. 4, at t2*a*, since the address values of the write pointer WP and the read pointer RP are the same as 2, the buffer may be in a state in which the buffer is empty and no stored valid data exists.

While the write pointer WP is reset, the address value of the write pointer WP may be updated from 2 to 0.

At t2*b*, the address value of the write pointer WP is 0 and the address value of the read pointer RP is 2, which are different from each other. Therefore, the buffer may not be empty.

Therefore, while the read pointer RP is sequentially updated to Address 3 to Address 7 and Address 0, malfunction that invalid data stored at each address is read (or popped) may occur.

Figure 5:
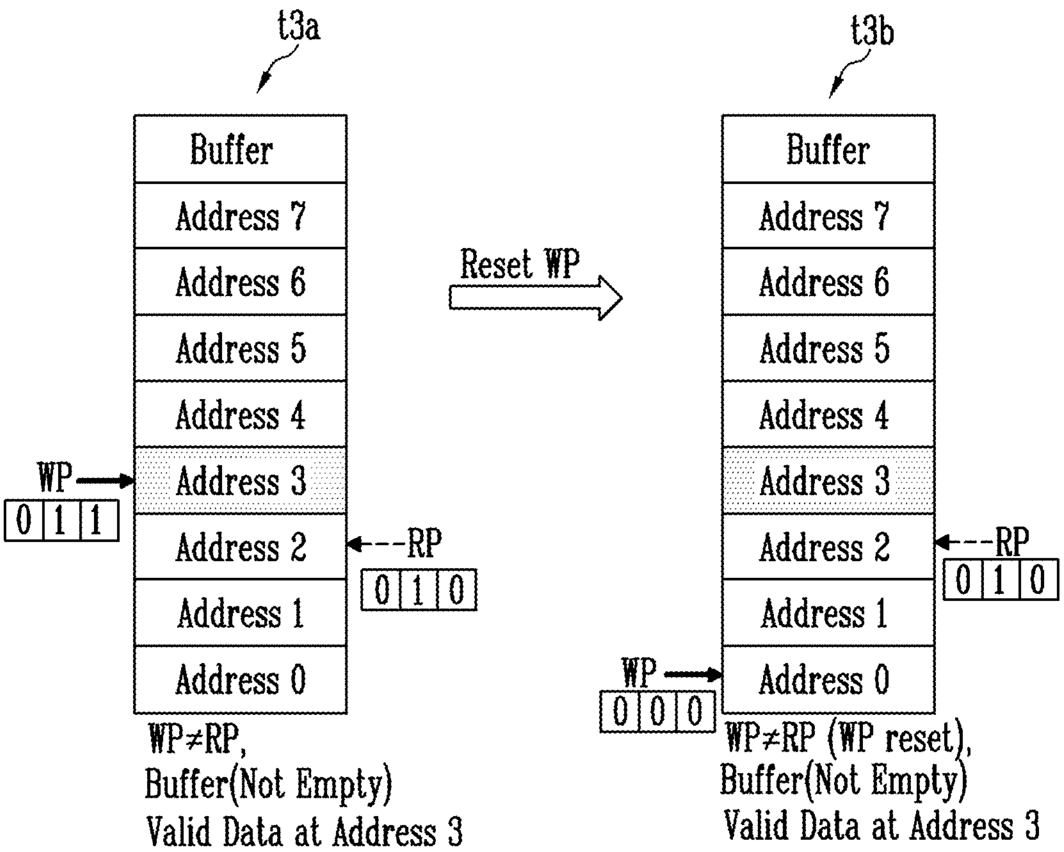
FIG. 5 is a diagram illustrating an operation of the buffer when the write pointer is reset in accordance with an embodiment of the present disclosure.

FIG. 5 is a diagram illustrating an operation of the buffer when the write pointer is reset in accordance with an embodiment of the present disclosure.

Referring to FIG. 5, at t3*a*, the address value of the write pointer WP is 3 and the address value of the read pointer RP is 2, which are different from each other. Therefore, the buffer may be in a state in which the buffer is not empty and valid data is stored at Address 3.

While the write pointer WP is reset, the address value of the write pointer WP may be updated from 3 to 0. Since the read pointer RP and the write pointer WP have different operation clocks, the read pointer RP may not be reset.

At t3*b*, the address value of the write pointer WP is 0 and the address value of the read pointer RP is 2, which are different from each other. Therefore, the buffer may not be empty.

Therefore, the valid data stored at Address 3 may be read while the read pointer RP is updated to Address 3. After that, while the read pointer RP is sequentially updated to Address 4 to Address 7 and Address 0, malfunction that invalid data stored at each address is read (or popped) may occur.

Figure 6:
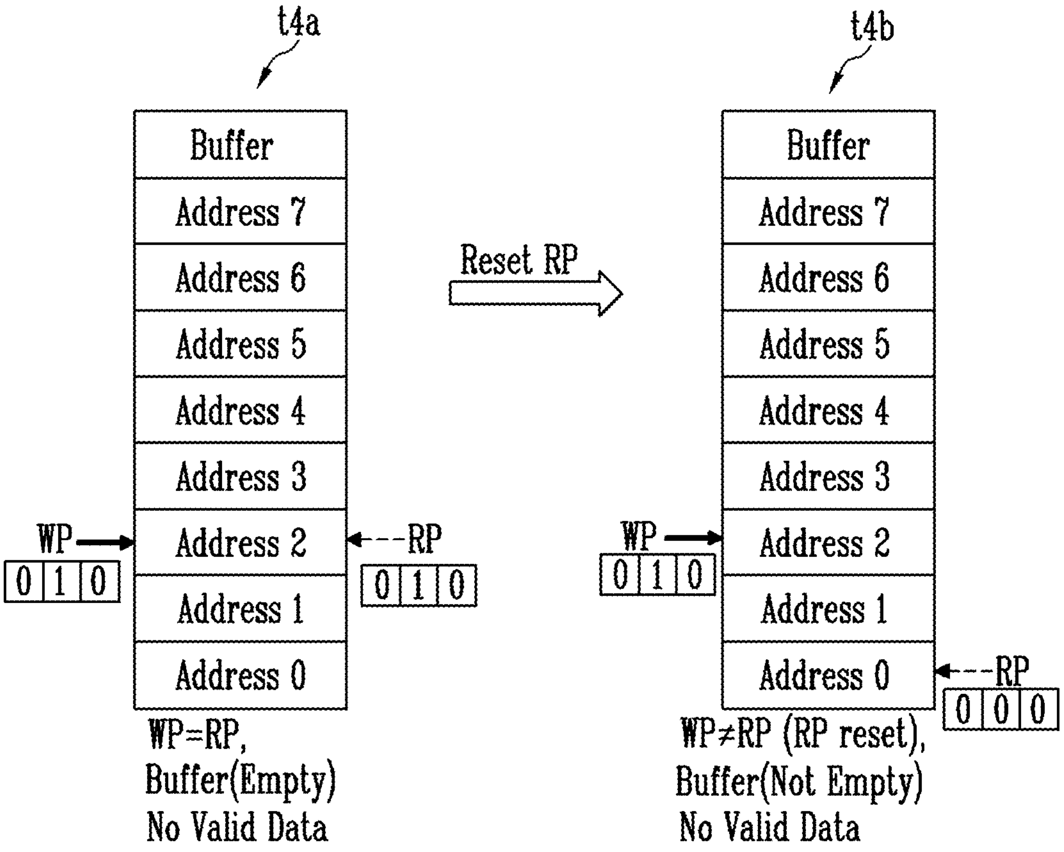
FIG. 6 is a diagram illustrating an operation of the buffer when a read pointer is reset in accordance with an embodiment of the present disclosure.

FIG. 6 is a diagram illustrating an operation of the buffer when the read pointer is reset in accordance with an embodiment of the present disclosure.

Referring to FIG. 6, at t4*a*, since the address values of the write pointer WP and the read pointer RP are the same as 2, the buffer may be in a state in which the buffer is empty and no stored valid data exists.

While the read pointer RP is reset, the address value of the read pointer RP may be updated from 2 to 0. Since the write pointer WP and the read pointer RP have different operation clocks, the read pointer RP may not be reset.

At t4*b*, the address value of the write pointer WP is 2 and the address value of the read pointer RP is 0, which are different from each other. Therefore, the buffer may not be empty. However, since the read pointer RP is in a state in which the read pointer RP is reset, data reading from the buffer and updating of the read pointer RP may not be performed.

Since the interface device corresponding to the write pointer WP does not recognize that the read pointer RP corresponding to the other interface device is reset, malfunction that data is written (or pushed) to the buffer and the write pointer WP is updated after t4*b* may occur.

Figure 7:
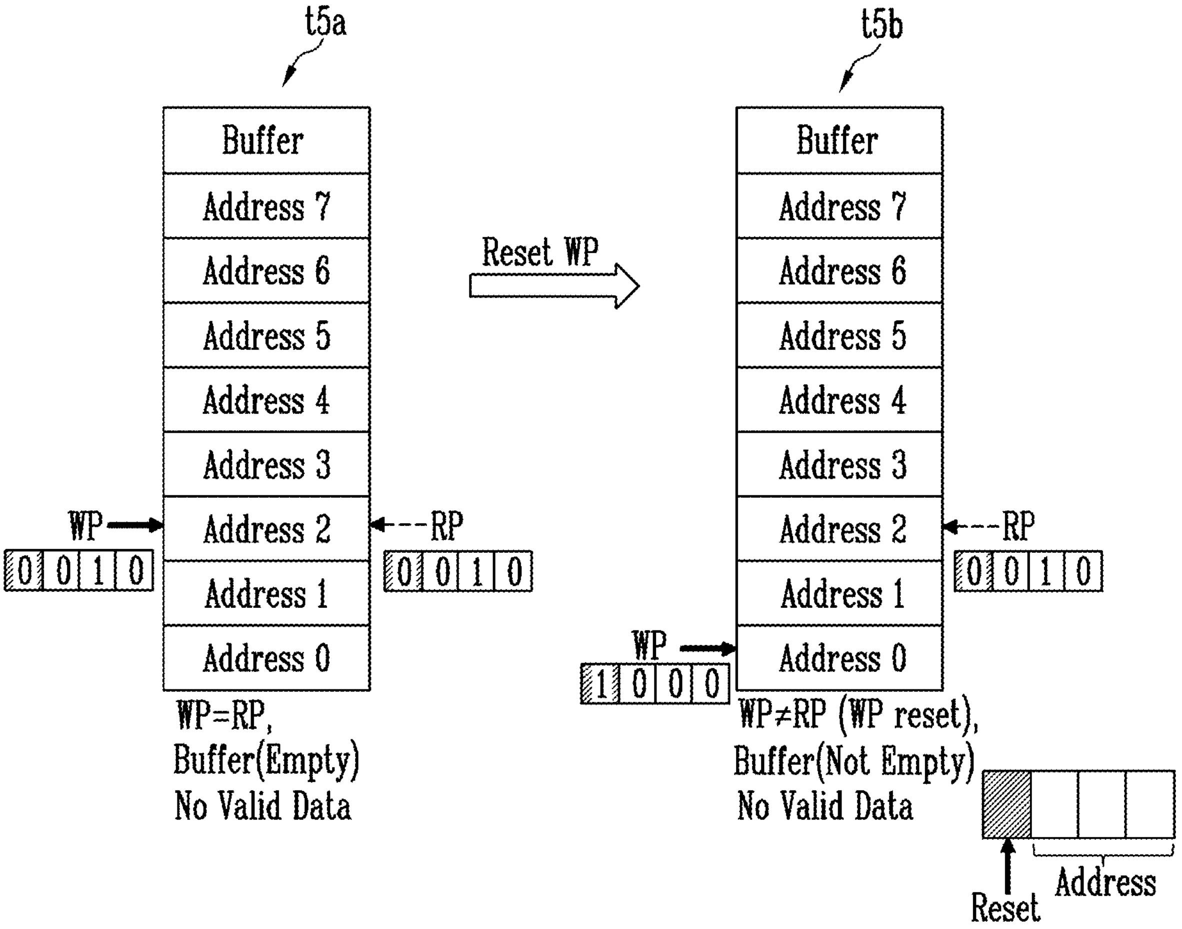
FIG. 7 is a diagram illustrating an operation of the buffer when the write pointer including a data bit indicating a reset signal is reset in accordance with an embodiment of the present disclosure.

FIG. 7 is a diagram illustrating an operation of the buffer when the write pointer including a data bit indicating a reset signal is reset in accordance with an embodiment of the present disclosure.

Referring to FIG. 7, each of the read pointer RP and the write pointer WP may include data bits indicating an address and a data bit indicating a reset signal. The data bit indicating the reset signal may be a most significant data bit among a plurality of data bits indicated by the write pointer or the read pointer.

At t5*a*, since the address values of the write pointer WP and the read pointer RP are the same as 2, the buffer may be in a state in which the buffer is empty and no stored valid data exists.

While the write pointer WP is reset, the address value of the write pointer WP may be updated from 2 to 0, and a reset signal value of the write pointer WP may be updated from 0 to 1.

At t5*b*, the address value of the write pointer WP is 0 and the address value of the read pointer is 2, which are different from each other. Therefore, the buffer may not be empty.

However, since the reset signal of the write pointer WP is in a state in which the reset signal is activated, the interface device corresponding to the read pointer RP may recognize that the write pointer WP corresponding to the other interface device is reset, and suspend data reading (or data popping) from the buffer and updating of the read pointer RP. Thus, as compared with the embodiment described with reference to FIG. 4, malfunction that invalid data stored at Address 3 to Address 7 and Address 0 is read (or popped) can be prevented.

Figure 8:
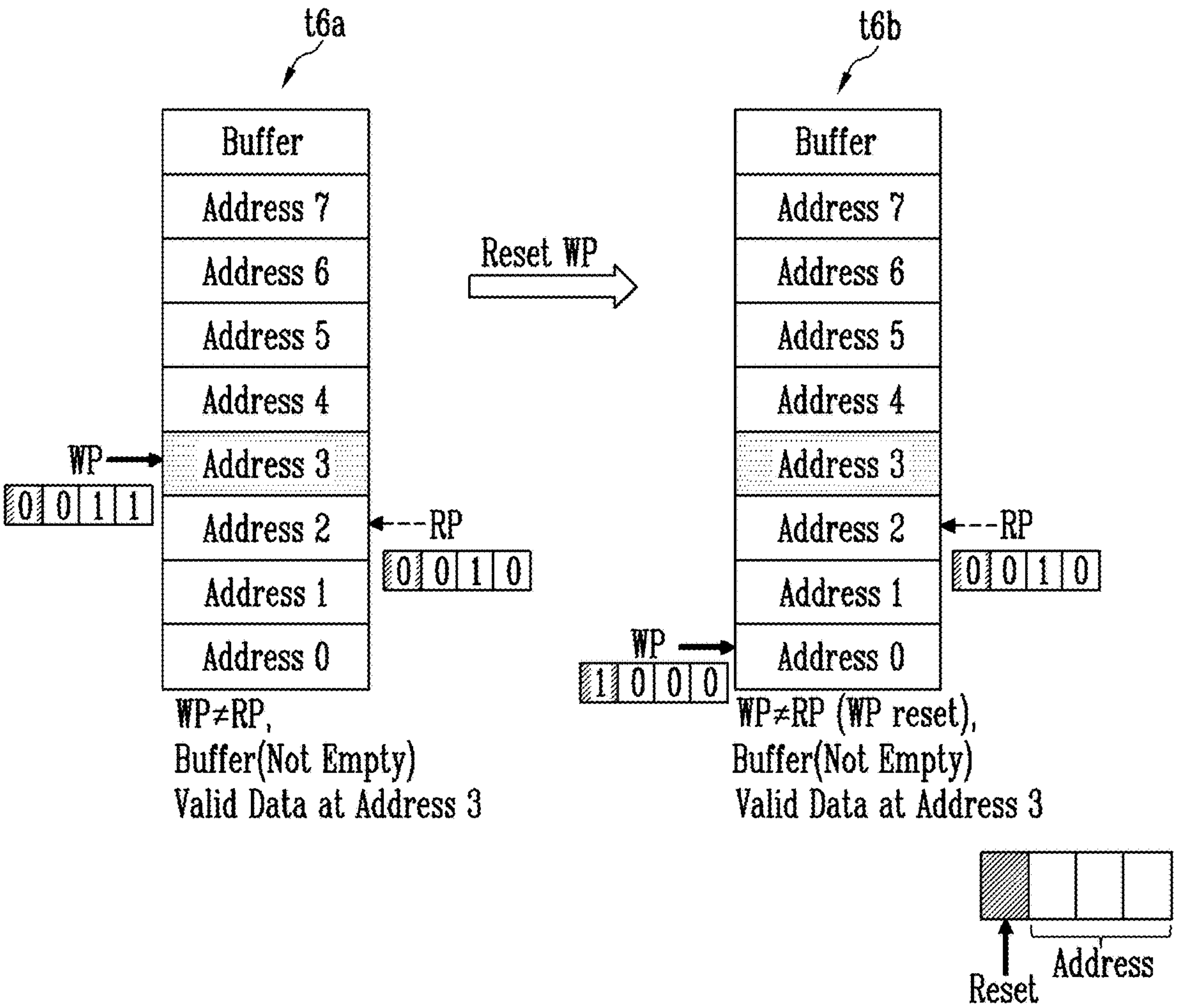
FIG. 8 is a diagram illustrating an operation of the buffer when the write pointer including a data bit indicating a reset signal is reset in accordance with an embodiment of the present disclosure.

FIG. 8 is a diagram illustrating an operation of the buffer when the write pointer including the data bit indicating the reset signal is reset in accordance with an embodiment of the present disclosure.

Referring to FIG. 8, at t6*a*, the address value of the write pointer WP is 3 and the address value of the read pointer RP is 2, which are different from each other. Therefore, the buffer may be in a state in which the buffer is not empty and valid data is stored at Address 3.

While the write pointer WP is reset, the address value of the write pointer WP may be updated from 3 to 0, and the reset signal value of the write pointer WP may be updated from 0 to 1.

At t6*b*, the address value of the write pointer WP is 0 and the address value of the read pointer RP is 2, which are different from each other. Therefore, the buffer may not be empty.

However, since the reset signal of the write pointer WP is in a state in which the reset signal is activated, the interface device corresponding to the read pointer RP may recognize that the write pointer WP corresponding to the other interface device is reset, and suspend data reading (or data popping) from the buffer and updating of the read pointer RP.

Thus, as compared with the embodiment described with reference to FIG. 5, malfunction that invalid data stored at Address 4 to Address 7 and Address 0 is read (or popped) can be prevented. Even when valid data stored at Address 3 is lost, such malfunction can be prevented.

Figure 9:
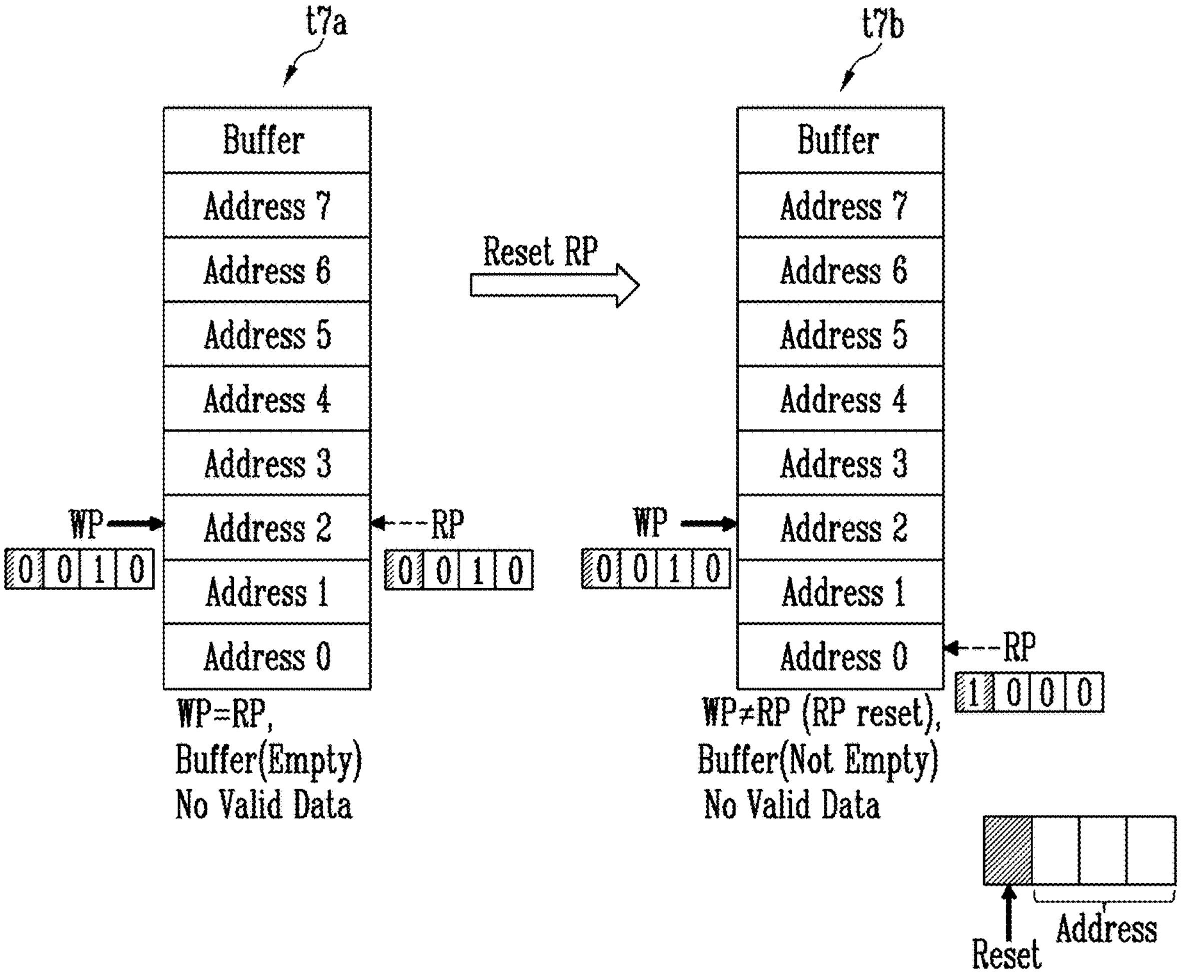
FIG. 9 is a diagram illustrating an operation of the buffer when the read pointer including a data bit indicating a reset signal is reset in accordance with an embodiment of the present disclosure.

FIG. 9 is a diagram illustrating an operation of the buffer when the read pointer including the data bit indicating the reset signal is reset in accordance with an embodiment of the present disclosure.

Referring to FIG. 9, at t7*a*, since the address values of the write pointer WP and the read pointer RP are the same as 2, the buffer may be in a state in which the buffer is empty and no stored valid data exists.

While the read pointer RP is reset, the address value of the read pointer RP may be updated from 2 to 0, and a reset signal value of the read pointer RP may be updated from 0 to 1.

At t7*b*, the address value of the write pointer WP is 2 and the address value of the read pointer RP is 0, which are different from each other. Therefore, the buffer may not be empty. However, since the read pointer RP is in a state in which the read pointer RP is reset, data reading (or data popping) from the buffer and updating of the read pointer RP may not be performed.

In addition, since the reset signal of the read pointer RP is in a state in which the reset signal is activated, the interface device corresponding to the write pointer WP may recognize that the read pointer RP corresponding to the other interface device is reset, and suspend data writing (or data pushing) to the buffer and updating of the write pointer WP.

Thus, as compared with the embodiment described with reference to FIG. 6, malfunction that data is written (or pushed) to the buffer and the write pointer WP is updated after t7*b* can be prevented.

Figure 10:
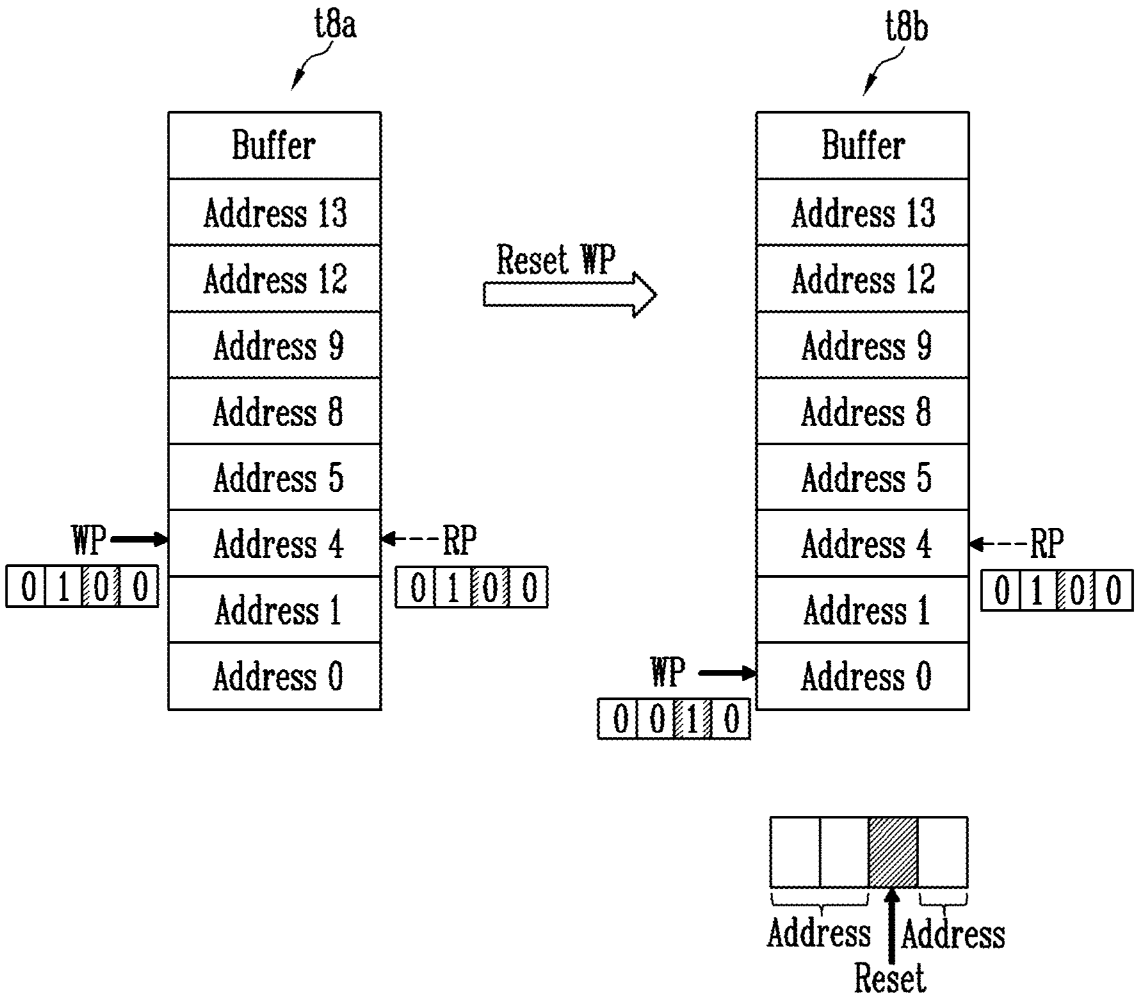
FIG. 10 is a diagram illustrating an operation of a buffer when the write pointer is reset in a case where a position of a data bit indicating a reset signal is differently set.

FIG. 10 is a diagram illustrating an operation of the buffer when the write pointer is reset in a case where a position of a data bit indicating a reset signal is differently set.

Referring to FIG. 10, each of the read pointer RP and the write pointer WP may include data bits indicating an address and a data bit indicating a reset signal. The data bit indicating the reset signal may be an nth (n is a natural number of 1 or more) data bit among a plurality of data bits indicated by the write pointer or the read pointer. An order may be counted from the right to the left. In FIG. 10, it is assumed and described that n is 2.

At t8*a*, since the address values of the write pointer WP and the read pointer RP are the same as 4, the buffer may be in a state in which the buffer is empty and no stored valid data exists.

While the write pointer WP is reset, the address value of the write pointer WP may be updated from 4 to 0, and a reset signal value of the writer pointer WP may be updated from 0 to 1.

At t8*b*, the address value of the write pointer WP is 0 and the address value of the read pointer RP is 4, which are different from each other. Therefore, the buffer may not be empty.

However, since the reset signal of the write pointer WP is in a state in which the reset signal is activated, the interface device corresponding to the read pointer RP may recognize that the write pointer WP corresponding to the other interface device is reset, and suspend data reading (or data popping) from the buffer and updating of the read pointer RP.

Figure 11:
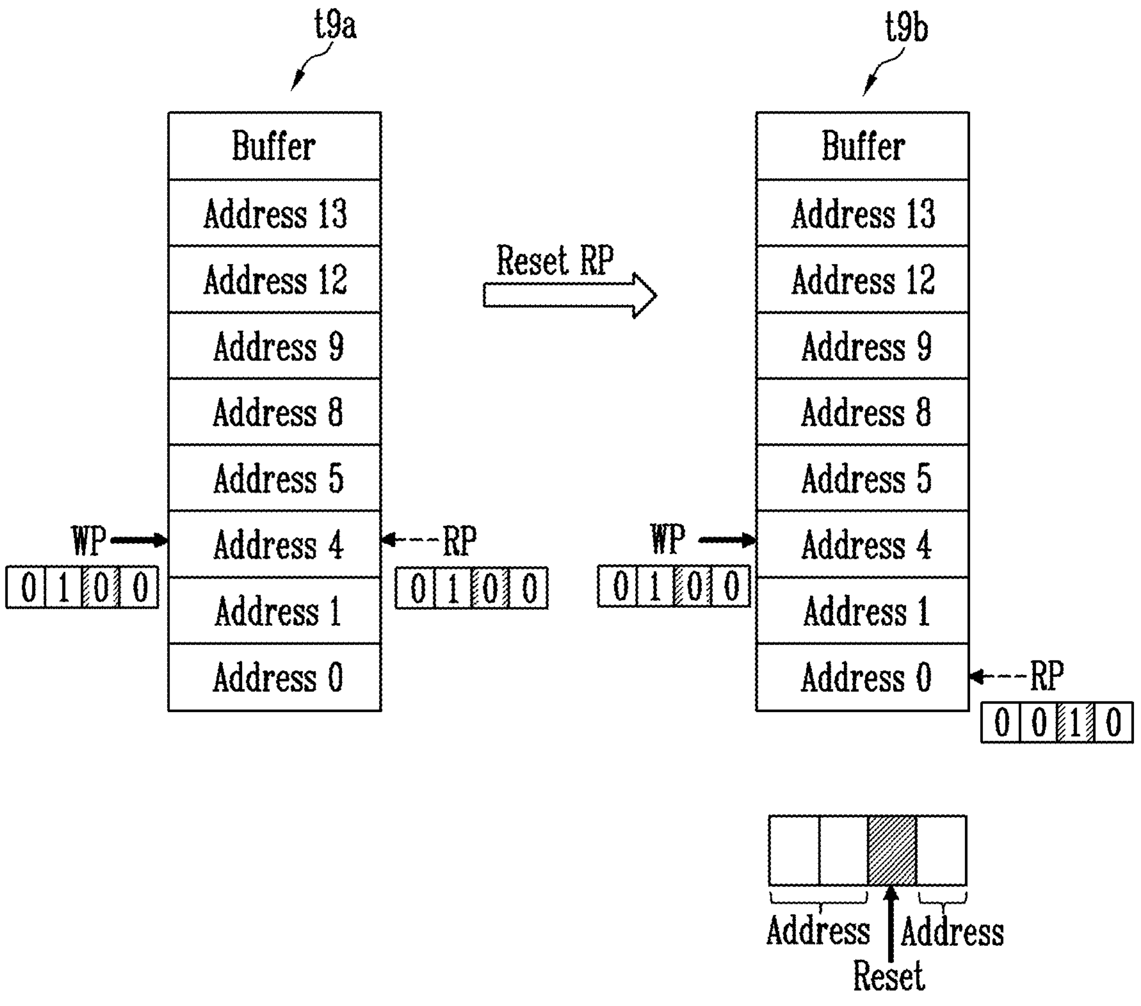
FIG. 11 is a diagram illustrating an operation of the buffer when the read pointer is reset in a case where a position of a data bit indicating a reset signal is differently set.

FIG. 11 is a diagram illustrating an operation of the buffer when the read pointer is reset in a case where a position of a data bit indicating a reset signal is differently set.

Referring to FIG. 11, a data bit indicating a reset signal may be an nth (n is a natural number of 1 or more) data bit among a plurality of data bits indicated by the write pointer or the read pointer. An order may be counted from the right to the left. In FIG. 11, it is assumed and described that n is 2.

At t9*a*, since the address values of the write pointer WP and the read pointer RP are the same as 4, the buffer may be in a state in which the buffer is empty and no stored valid data exists.

While the read pointer RP is reset, the address value of the read pointer RP may be updated from 4 to 0, and a reset signal value of the read pointer RP may be updated from 0 to 1.

At t9*b*, the address value of the write pointer WP is 4 and the address value of the read pointer RP is 0, which are different from each other. Therefore, the buffer may not be empty. However, since the read pointer RP is in a state in which the read pointer RP is reset, data reading (or data popping) from the buffer and updating of the read pointer RP may not be performed.

In addition, since the reset signal of the read pointer RP is in a state in which the reset signal is activated, the interface device corresponding to the write pointer WP may recognize that the read pointer RP corresponding to the other interface device is reset, and suspend data writing (or data pushing) to the buffer and updating of the write pointer WP.

Figure 12:
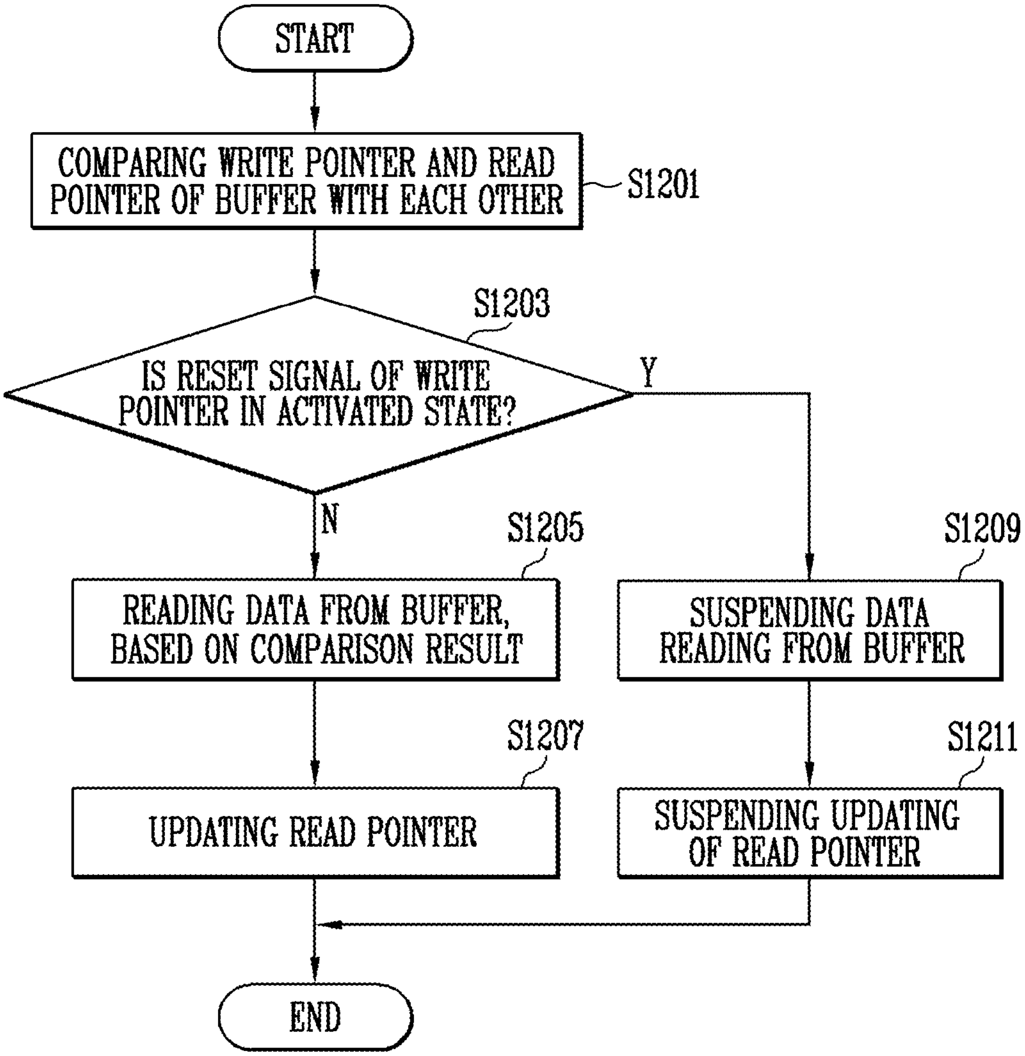
FIG. 12 is a flowchart illustrating an operation of the interface system in accordance with an embodiment of the present disclosure.

FIG. 12 is a flowchart illustrating an operation of the interface system in accordance with an embodiment of the present disclosure.

Referring to FIG. 12, in S1201, the interface system may compare a write pointer with a read pointer of a buffer.

In S1203, the interface system may determine whether a reset signal of the write pointer is in an activated state. As a determination result, when the reset signal is in the activated state (S1203, Y), the interface system may proceed to S1209. As a determination result, when the reset signal is in an inactivated state (S1203, N), the interface system may proceed to S1205.

In S1205, the interface system may read data from the buffer, based on a comparison result of the write pointer and the read pointer.

In S1207, the interface system may update the read pointer such that the read pointer indicates an address of the buffer from which the data is read.

In S1209, the interface system may suspend data reading from the buffer.

In S1211, the interface system may suspend updating of the read pointer.

Figure 13:
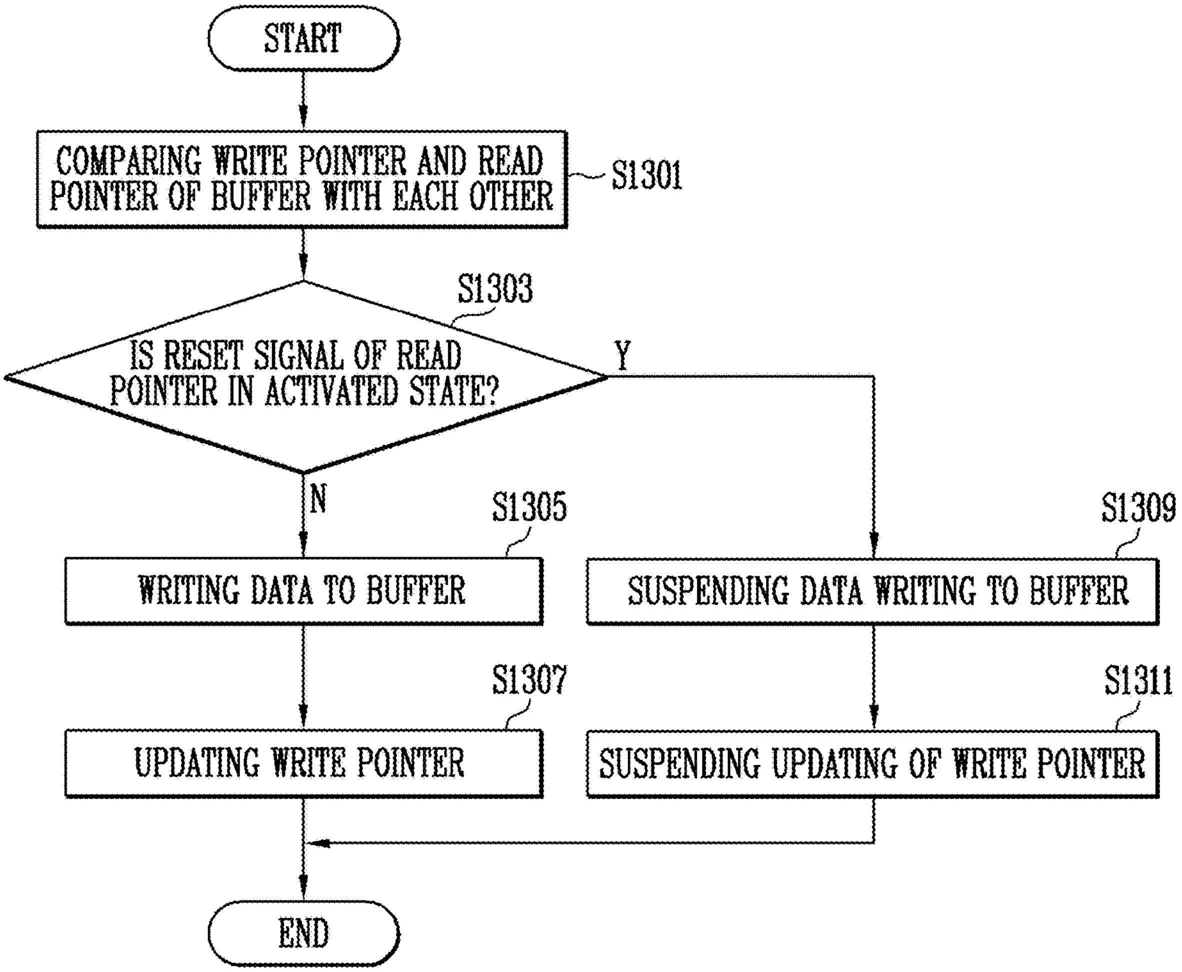
FIG. 13 is a flowchart illustrating an operation of the interface system in accordance with an embodiment of the present disclosure.

FIG. 13 is a flowchart illustrating an operation of the interface system in accordance with an embodiment of the present disclosure.

Referring to FIG. 13, in S1301, the interface system may compare a write pointer with a read pointer of a buffer.

In S1303, the interface system may determine whether a reset signal of the read pointer is in an activated state. As a determination result, when the reset signal is in the activated state (S1303, Y), the interface system may proceed to S1309. As a determination result, when the reset signal is in an inactivated state (S1303, N), the interface system may proceed to S1305.

In S1305, the interface system may write data to the buffer.

In S1307, the interface system may update the write pointer such that the write pointer indicates an address of the buffer to which the data is written.

In S1309, the interface system may suspend data writing to the buffer.

In S1311, the interface system may suspend updating of the write pointer.

In accordance with the present disclosure, there can be provided an interface system and an operating method thereof, which can prevent malfunction in a reset operation of interface devices operating according to different clocks.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An interface system comprising:

a first interface device including a first buffer; and a second interface device including a second buffer, wherein the first interface device compares a write pointer of the first buffer with a read pointer of the first buffer, and updates the read pointer based on the comparison result, the write pointer of the first buffer corresponds to the second interface device, and the read pointer of the first buffer corresponds to the first interface device, wherein each of the write pointer of the first buffer and the read pointer of the first buffer includes data bits indicating an address of the first buffer and a data bit indicating a reset signal, and wherein the first interface device selectively updates the read pointer according to the reset signal of the write pointer of the first buffer.

2. The interface system of claim 1, wherein, when the reset signal of the write pointer of the first buffer is in an activated state, the first interface device suspends data reading from the first buffer and updating of the read pointer of the first buffer.

3. The interface system of claim 1, wherein, when the reset signal of the write pointer of the first buffer is in an inactivated state, the first interface device performs data reading from the first buffer and updating of the read pointer of the first buffer, based on the comparison result.

4. The interface system of claim 1, wherein, when a reset signal of a read pointer of the second buffer, which corresponds to the second interface device, is in an activated state, the first interface device suspends data writing to the second buffer and updating of a write pointer of the second buffer.

5. The interface system of claim 1, wherein, when the reset signal of the read pointer of the first buffer is in an activated state, the second interface device suspends data writing to the first buffer and updating of the write pointer of the first buffer.

6. The interface system of claim 1, wherein the first interface device operates according to a first clock, and the second interface device operates according to a second clock different from the first clock.

7. The interface system of claim 6, wherein the first interface device compares the read pointer of the first buffer with the write pointer of the first buffer, which is Clock Domain Crossing (CDC) processed according to the first clock instead of the second clock.

8. The interface system of claim 1, wherein the first interface device transmits data to the second interface device through a first channel, and the second interface device transmits data to the first interface device through a second channel different from the first channel.

9. The interface system of claim 8, wherein the first channel includes at least one of a read address channel, a write address channel, and a write data channel of an Advanced extensible Interface (AXI) protocol.

10. The interface system of claim 8, wherein the second channel includes at least one of a read data channel and a write response channel of an Advanced extensible Interface (AXI) protocol.

11. The interface system of claim 1, wherein the first interface device and the second interface device operate as an asynchronous interface.

12. The interface system of claim 1, wherein the first buffer and the second buffer include a First-In First-Out (FIFO) data structure.

13. The interface system of claim 1, wherein the data bit indicating the reset signal is a most significant bit among a plurality of data bits indicated by the write pointer or the read pointer, and the plurality of data bits include the data bits and the most significant bit.

14. The interface system of claim 1, wherein the data bit indicating the reset signal is an nth (n is a natural number of 1 or more) data bit among a plurality of data bits indicated by the write pointer or the read pointer, and the plurality of data bits include the data bits and the most significant bit.

15. A method of operating an interface system including a first interface device including a first buffer and a second interface device including a second buffer, the method comprising:

comparing, by the first interface device, a write pointer of the first buffer with a read pointer of the first buffer, wherein the write pointer of the first buffer corresponds to the second interface device, and the read pointer of the first buffer corresponds to the first interface device; and selectively updating, by the first interface device, the read pointer of the first buffer based on the comparison result and a reset signal of the write pointer of the first buffer, wherein each of the write pointer of the first buffer and the read pointer of the first buffer includes data bits indicating an address of the first buffer and a data bit indicating the reset signal.

16. The method of claim 15, wherein the selectively updating includes:

performing, by the first interface device, data reading from the first buffer and updating of the read pointer of the first buffer, based on the comparison result, when the reset signal of the write pointer of the first buffer is in an inactivated state; and suspending, by the first interface device, data reading from the first buffer and updating of the read pointer of the first buffer when the reset signal of the write pointer of the first buffer is in an activated state.

17. The method of claim 15, further comprising suspending, by the first interface device, data writing to the second buffer and updating of a write pointer of the second buffer when a reset signal of a read pointer of the second buffer, which corresponds to the second interface device, is in an activated state.

18. The method of claim 15, further comprising suspending, by the second interface device, data writing to the first buffer and updating of the write pointer of the first buffer when the reset signal of the read pointer of the first buffer is in an activated state.

19. The method of claim 15, further comprising:

transmitting, by the first interface device, data to the second interface device through a first channel; and transmitting, by the second interface device, data to the first interface device through a second channel.

20. The method of claim 19, wherein the first channel includes at least one of a read address channel, a write address channel, and a write data channel of an Advanced extensible Interface (AXI) protocol, and wherein the second channel includes at least one of a read data channel and a write response channel of the AXI protocol.

* * * * *